Patented Sept. 1, 1942

2,294,651

UNITED STATES PATENT OFFICE 2,294,651

HIGH-GLOSS COATED MATERIAL

Wyly M. Billing, Wilmington, Del., assignor to Hercules Powder Company, Wilmington, Del., a corporation of Delaware No Drawing. Application October 26, 1936, Serial No. 107,624

13 Claims. (Cl. 117—155)

My invention relates to an improvement in high gloss coated material of moistureproof and greaseproof characteristics, and to a method for the production thereof.

Coated sheets have heretofore been produced by the application of resinous materials to sheets, but such products have all presented disadvantages, and in no cases have they shown the very high gloss and combined the other advantages of the material in accordance with this invention and been so completely free of disadvantages.

Coated sheet material has heretofore been produced by coating paper with phenol-formaldehyde resin and wax. The coated paper so produced has distinct disadvantages in that it is not initially of good color, rapidly yellows on exposure to ultra-violet light and has a strong tendency to brittleness and objectionable odor. Likewise, coated sheet material has been produced by coating paper with a resinous polybasic acid-polyhydric alcohol reaction product and wax, such as a modified glycerol phthalate resin and wax. Such a sheet has not proved satisfactory for various reasons, the most important of which are that the sheets will adhere together even on touching and that the coating becomes very soft and tacky at very slightly elevated temperatures.

The object of my invention is to provide a high-gloss coated material which is substantially free from the disadvantages which have heretofore been shown by coated materials of this type. Thus, in accordance with this invention, I provide a coated material which presents the advantages of the phenol-formaldehyde resin coated papers without their strong tendency to yellow on exposure to ultraviolet light, their tendency to brittleness, their odor or their taste, and of the polybasic acid-polyhydric alcohol resin-coated papers without their tendency to tackiness and to block or adhere together in solid masses when rolled or stacked.

It is a further object of my invention to provide a high-gloss coated sheet characterized by greaseproofness, waterproofness and moistureproofness, which is adapted for various uses where protection against moisture, water, oils, and greases is desired, as in packaging, wrapping, etc., and which is flexible, non-tacky, of high-gloss and clarity, of good color and resistant to discoloration and embrittlement on exposure to ultraviolet light. The product in accordance with my invention is particularly adapted for use in packing food products where high-gloss, light color, freedom from odor, and taste are essential.

It is a still further object of my invention to provide a method for coating sheet material without the use of a volatile solvent with the attendant disadvantages of high cost, fire hazard, striking through, etc., to produce a high-gloss coating of minimum weight.

Now, in accordance with my invention, there is provided a high-gloss coated material, as a sheet, which comprises a base material coated with a composition comprising the resinous reaction product of ethylene glycol and a terpene-maleic anhydride condensate and a softening resin compatible therewith. The composition used in coating the base may, and in many cases will desirably, contain a waxy material admixed therewith.

The ethylene glycol-terpene maleic anhydride resinous reaction product used in accordance with this invention, is the reaction product of ethylene glycol with a condensate of maleic anhydride and a terpene, such as, for example, terpinene, terpinolene, dipentene, pinene, etc., and may be produced by following the procedures disclosed in U. S. Patent 1,993,025, to Ernest G. Peterson and Edwin R. Littmann, U. S. Patents 1,993,027, 1,993,031, and 1,993,032 to Ernest G. Peterson, U. S. Patent 1,993,034 to Irvin W. Humphrey, and U. S. Patent 1,993,035 to Edwin R. Littmann.

The softening resin used in admixture with the ethylene glycol-terpene maleic anhydride resin may be any light-colored greaseproof resin which is softer than the ethylene glycol-terpene maleic anhydride resin and compatible therewith, such as, for example, a diethylene glycol-terpene maleic anhydride resin, a triethylene glycol-terpene maleic anhydride resin, a greaseproof monohydric alcohol ester of a terpene-maleic anhydride, a soft, unmodified, alkyd type resin, as a glycol phthalate resin, etc. The diethylene glycol-terpene maleic anhydride and triethylene glycol-terpene maleic anhydride resins are the reaction products of diethylene glycol and triethylene glycol, respectively, with a condensate of maleic anhydride and a terpene, such as, for example, terpinene, terpinolene, dipentene, pinene, etc., and may be produced by following the procedures disclosed in the patents listed hereinbefore.

If desired, preparation of the composition may be carried out in one esterification step. For example, the mixture of the ethylene glycol ester of a terpene-maleic anhydride and a soft, greaseproof resin, such as the diethylene glycol ester of a terpene-maleic anhydride or a greaseproof monohydric alcohol ester of a terpene-maleic anhydride, may be prepared by esterifying simultaneously the necessary mixture of ingredients.

The products, in accordance with my invention, are normally non-tacky at room temperatures. However, when a product is desired which is non-tacky at elevated temperatures and resistant to blocking at elevated temperatures, yet highly flexible at normal temperatures, it is desirable to add a relatively small quantity of wax to the coating composition.

Suitable waxy materials for use, if desired, in the composition in accordance with this invention are, for example, paraffin wax, ceresin wax, carnauba wax, candelilla wax, beeswax, opal wax, stearic acid, etc., and may be used in amounts within the range of about 2% to about 10% by weight of the resin mixture.

In some cases I find it desirable to extend or dilute the coating composition by addition of natural resins inert under the conditions of my process, e. g., I may add to my composition dammar gum, or the like.

The base coated to produce my new product may be for example a fibrous cellulosic sheet, as, glassine paper, etc., a non-fibrous cellulosic sheet, as the regenerated cellulose sheet material known in the trade as "Cellophane," etc., a cellulose derivative sheet, as cellulose acetate sheets, etc.; a non-cellulosic sheet, as, gelatine, etc.

The coating composition in accordance with my invention may include ethylene glycol-terpene maleic anhydride resin and the softening resin in widely varying proportions, and will be chosen so as to produce a coating having the maximum flexibility without being tacky. Ordinarily, I employ the softening resin in amount within the range of about 5% to about 30% by weight of the ethylene glycol-terpene maleic anhydride resin. When a wax is used in the composition, the relative proportions of the ethylene glycol-terpene maleic anhydride resin and of the softening resin which I prefer to use will vary somewhat with the hardness of the wax used. Thus, when a high melting wax, such as for example, carnauba wax, is used a higher proportion of the softening resin is used than when a soft wax, such as, for example, paraffin wax is used.

As illustrative of the practical adaptation of my invention the compositions given in the table below will be found to give satisfactory results.

|  | 1 | 2 | 3 | 4 | 5 | 6 | 7 | 8 |
|---|---|---|---|---|---|---|---|---|
| Ethylene glycol-terpinene maleic anhydride | 90 | 90 | 85 | 80 | 85 | 90 | 63 | 70 |
| Diethyleneglycol-terpinene maleic anhydride | 10 | 10 | 10 |  |  | 10 | 15 | 5 |
| Triethylene glycol-terpinene maleic anhydride |  |  |  |  | 10 |  |  |  |
| Glycol phthalate |  |  |  | 15 |  |  |  |  |
| Paraffin wax |  |  | 5 |  |  |  |  | 5 |
| Carnauba wax | 10 |  |  | 5 |  |  |  |  |
| Candelilla wax |  | 10 |  |  | 5 |  |  |  |
| Opal wax |  |  |  |  |  | 10 | 7 | 10 |
| Dammar gum |  |  |  |  |  |  |  | 10 |
| Cumarone-indene Resin |  |  |  |  |  |  | 15 |  |

The coating compositions in accordance with this invention may be applied to the base in any suitable manner. Thus, I may, for example, apply them to a base in the form of a solution in a suitable volatile solvent, such as toluene-acetone, toluene-butyl acetate, benzene-acetone, benzene-ethyl acetate, benzene-glycol monoethyl ether, or the like. A toluene-acetone mixture will be found to be a particularly effective solvent.

I prefer, however, to apply these compositions in the molten condition, thus avoiding the cost and fire hazards involved in the use of a volatile solvent and the additional disadvantage that the solvent type coatings tend to strike into the paper thus wasting the coating material. To apply these compositions to a base in the molten condition, the mixture of ingredients may be heated together to a temperature within the range of about 275° F. to about 325° F. and the mixture applied to the base as a uniform, thin coating while still hot, and then allowed to cool before it comes into contact with any solid object which will mar the coating. This may be conveniently done by the use of a roller coating machine or similar paper-coating machine equipped with a means for maintaining the resins in the reservoir at a temperature above their melting point.

For some purposes, it is desirable that the coated paper produced have heat-sealing properties, i. e. the coated surface seal to uncoated paper simply by application of heat and pressure. When this property is desired in the coating I prefer to add to my composition a small amount of a heat-curing resin, e. g., cumarone-indene resin, as exemplified in composition 7 of the above table.

The coating composition may be pigmented by grinding suitable pigments, either white or colored with the coating composition. Thus, a white pigmented coating composition may be obtained by use of titanium dioxide, which greatly improves the appearance of the product when the base coated is an inferior grade of paper. Such products resemble the so-called "flinted" papers and are much cheaper to produce.

The products in accordance with this invention can be printed by the use of an ordinary printing ink. This is a distinct advantage which is not shown by other types of coated material. Thus, other types of resin-coated papers require specially adapted inks for satisfactory printing.

It will be understood that the details and examples hereinbefore set forth are illustrative only, and that the invention as herein broadly described and claimed is in no way limited thereby.

What I claim and desire to protect by Letters Patent is:

1. The method for the production of a surface-coated sheet material characterized by moistureproofness, greaseproofness, high gloss, freedom from odor and taste, and non-tackiness, which comprises applying to at least one surface of a sheet a thin surface coating of a synthetic resinous coating composition consisting substantially of between about 70 to about 95 parts by weight of a relatively hard ethylene glycol-terpene-maleic anhydride resin and between about 5 to about 30 parts by weight of a compatible, relatively soft polyhydric alcohol-terpene-maleic anhydride resin, and allowing the film to solidify.

2. The method for the production of a surface-coated sheet material characterized by moistureproofness, greaseproofness, high gloss, freedom from odor and taste, and non-tackiness, which comprises applying to at least one surface of a sheet a thin surface coating of a synthetic resinous coating composition consisting substantially of between about 70 to about 95 parts by weight of a relatively hard ethylene glycol-terpene-maleic anhydride resin, between about 5 to about 30 parts by weight of a compatible, relatively soft polyhydric alcohol-terpene-maleic anhydride resin and between about 2 and about 10 parts by weight of a wax, and allowing the film to solidify.

3. The method for the production of a surface-coated sheet material characterized by moistureproofness, greaseproofness, high gloss, freedom from odor and taste, and non-tackiness, which comprises heating to a temperature above its melting point yet below about 325° F., a synthetic resinous coating composition consisting substantially of between about 70 to about 95 parts by weight of an ethylene glycol-terpene-maleic anhydride resin and between about 5 to about 30 parts by weight of a compatible, relatively soft polyethylene glycol-terpene-maleic anhydride resin, applying the molten resinous composition in a thin film to a surface of a sheet and allowing the film to cool.

4. The method for the production of a surface-coated sheet material characterized by moistureproofness, greaseproofness, high gloss, freedom from odor and taste, and non-tackiness, which comprises heating to a temperature above its melting point yet below about 325° F., a synthetic resinous coating composition consisting substantially between about 70 to about 95 parts by weight of an ethylene glycol-terpene-maleic anhydride resin, between about 5 to about 30 parts by weight of a compatible, relatively soft polyethylene glycol-terpene-maleic anhydride resin, and between about 2 to about 10 parts by weight of a wax, applying the molten resinous composition in a thin film to a surface of a sheet and allowing the film to cool.

5. The method for the production of a surface-coated sheet material characterized by moistureproofness, greaseproofness, high gloss, freedom from odor and taste, and non-tackiness, which comprises heating to a temperature above its melting point yet below about 325° F., a synthetic resinous coating composition consisting substantially of between about 70 to 95 parts by weight of ethylene glycol-terpinene-maleic anhydride resin and between about 5 to about 30 parts by weight of polyethylene glycol-terpinene maleic anhydride resin, applying the molten resinous composition in a thin film to a surface of a sheet and allowing the film to cool.

6. The method for the production of a surface-coated sheet material characterized by moistureproofness, greaseproofness, high gloss, freedom from odor and taste, and non-tackiness, which comprises heating to a temperature above its melting point yet below about 325° F., a synthetic resinous coating composition consisting substantially of between about 70 to about 95 parts by weight of ethylene glycol-terpinene-maleic anhydride resin, between about 5 to about 30 parts by weight of diethylene glycol-terpinene-maleic anhydride resin and between about 2 to about 10 parts by weight of a wax, applying the molten resinous composition in a thin film to a surface of a sheet and allowing the film to cool.

7. The method for the production of a surface-coated sheet material characterized by moistureproofness, greaseproofness, high gloss, freedom from odor and taste, and non-tackiness, which comprises dissolving in an inert, volatile, organic solvent, a synthetic resinous coating composition consisting substantially of between about 70 to about 95 parts by weight of a relatively hard ethylene glycol-terpene-maleic anhydride resin and between about 5 to about 30 parts by weight of a compatible relatively soft polyhydric alcohol-terpene-maleic anhydride resin, applying the solution to a surface of a sheet, evaporating the solvent to apply the resinous coating composition as a thin surface coating on the sheet.

8. The method for the production of a surface-coated sheet material characterized by moistureproofness, greaseproofness, high gloss, freedom from odor and taste, and non-tackiness, which comprises dissolving in an inert, volatile, organic solvent, a synthetic resinous coating composition consisting substantially of between about 70 to about 95 parts by weight of a relatively hard ethylene glycol-terpene-maleic anhydride resin, between about 5 to about 30 parts by weight of a compatible, relatively soft polyhydric alcohol-terpene-maleic anhydride resin and between about 2 to about 10 parts by weight of a wax applying the solution to a surface of a sheet, evaporating the solvent to apply the resinous coating composition as a thin surface coating on the sheet.

9. The method for the production of a surface-coated sheet material characterized by moistureproofness, greaseproofness, high gloss, freedom from odor and taste, and non-tackiness, which comprises dissolving in an inert, volatile, organic solvent, a synthetic resinous coating composition consisting substantially of between about 70 to about 95 parts by weight of ethylene glycol-terpinene-maleic anhydride resin, between about 5 to about 30 parts by weight of a polyethylene glycol-terpinene-maleic anhydride resin and between about 2 to about 10 parts by weight of a wax, applying the solution to a surface of a sheet, and evaporating the solvent to apply the resinous coating composition as a thin surface coating on the sheet.

10. The method for the production of a surface-coated sheet material characterized by moistureproofness, greaseproofness, high gloss, freedom from odor and taste, and non-tackiness, which comprises applying to a surface of a sheet of cellulosic material a thin surface coating of a synthetic resinous coating composition consisting substantially of between about 70 to about 95 parts by weight of a relatively hard ethylene glycol-terpene-maleic anhydride resin and between about 5 to about 30 parts by weight of a compatible, relatively soft polyhydric alcohol-terpene-maleic anhydride resin.

11. The method for the production of a surface-coated sheet material characterized by moistureproofness, greaseproofness, high gloss, freedom from odor and taste, and non-tackiness, which comprises applying to a surface of a sheet of cellulosic material a thin surface coating of a synthetic resinous coating composition consisting substantially of between about 70 to about 95 parts by weight of an ethylene glycol-terpene-maleic anhydride resin, between about 5 to about 30 parts by weight of a softening polyethylene glycol-terpene-maleic anhydride resin and between about 2 to about 10 parts by weight of a wax.

12. A surface-coated sheet material characterized by moistureproofness, greaseproofness, high gloss, freedom from odor and taste, and non-tackiness, which comprises in combination a sheet at least one surface of which has coated as a thin film thereon a composition which consists substantially of between about 70 to about 95 parts by weight of a relatively hard ethylene glycol-terpene-maleic anhydride resin and between about 5 to about 30 parts by weight of a compatible, relatively soft polyhydric alcohol-terpene-maleic anhydride resin.

13. A surface-coated sheet material characterized by moistureproofness, greaseproofness, high gloss, freedom from odor and taste, and non-tackiness, which comprises in combination a sheet, at least one surface of which has coated as a thin film thereon a composition which consists substantially of between about 70 to about 95 parts by weight of an ethylene glycol-terpene-maleic anhydride resin, between about 5 to about 30 parts by weight of a softening polyhydric alcohol-terpene-maleic anhydride resin, and between about 2 to about 10 parts by weight of a wax.

WYLY M. BILLING.